Figure 2:
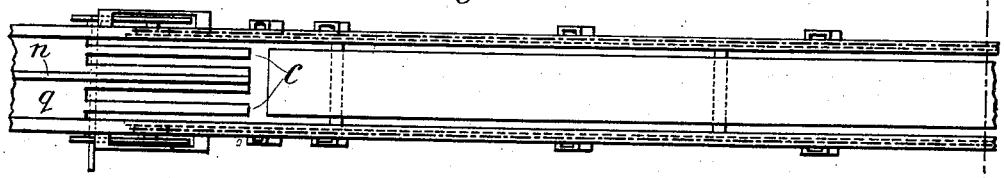

No. 896,430. PATENTED AUG. 18, 1908.
R. H. BISHOP & W. DOWN.
AMUSEMENT APPARATUS OF THE GRAVITY RAILWAY TYPE.
APPLICATION FILED APR. 3, 1908.

6 SHEETS—SHEET 1.

Witnesses:-
Henry Thieme
J. George Barry

Inventors

No. 896,430. PATENTED AUG. 18, 1908.
R. H. BISHOP & W. DOWN.
AMUSEMENT APPARATUS OF THE GRAVITY RAILWAY TYPE.
APPLICATION FILED APR. 3, 1908.
6 SHEETS—SHEET 2.
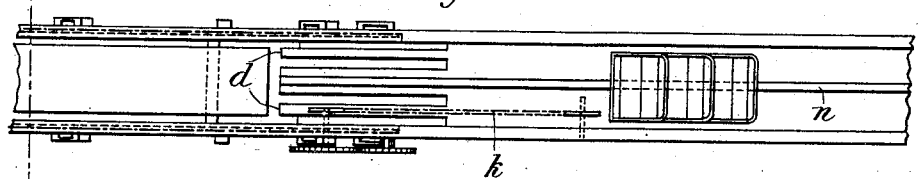
Fig. 2ª
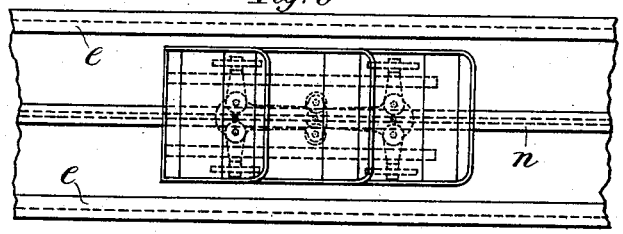
Fig. 6
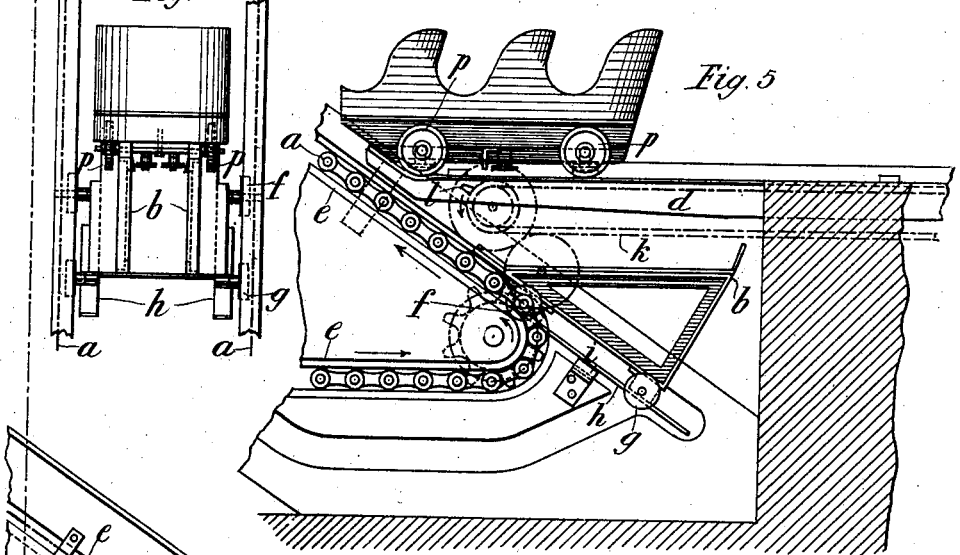
Fig. 3  Fig. 5
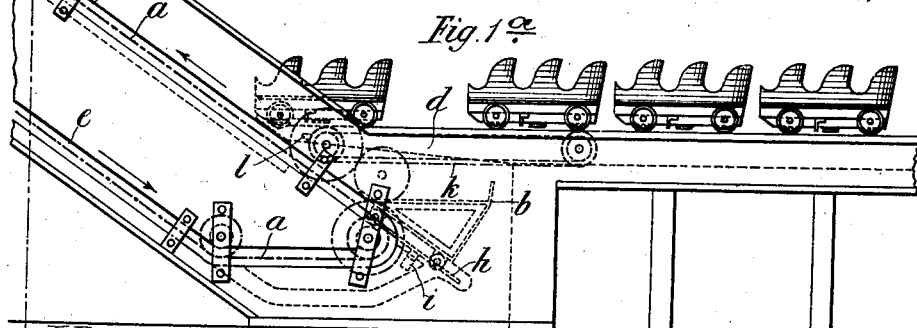
Fig. 1ª
Witnesses:— Inventors No. 896,430. PATENTED AUG. 18, 1908.
R. H. BISHOP & W. DOWN.
AMUSEMENT APPARATUS OF THE GRAVITY RAILWAY TYPE.
APPLICATION FILED APR. 3, 1908.
6 SHEETS—SHEET 3.

Witnesses:
Henry Thieme
F. George Barry.

Inventors:
Robert Hodges Bishop
William Down
by attorneys

No. 896,430. PATENTED AUG. 18, 1908.
R. H. BISHOP & W. DOWN.
AMUSEMENT APPARATUS OF THE GRAVITY RAILWAY TYPE.
APPLICATION FILED APR. 3, 1908.
6 SHEETS—SHEET 4.
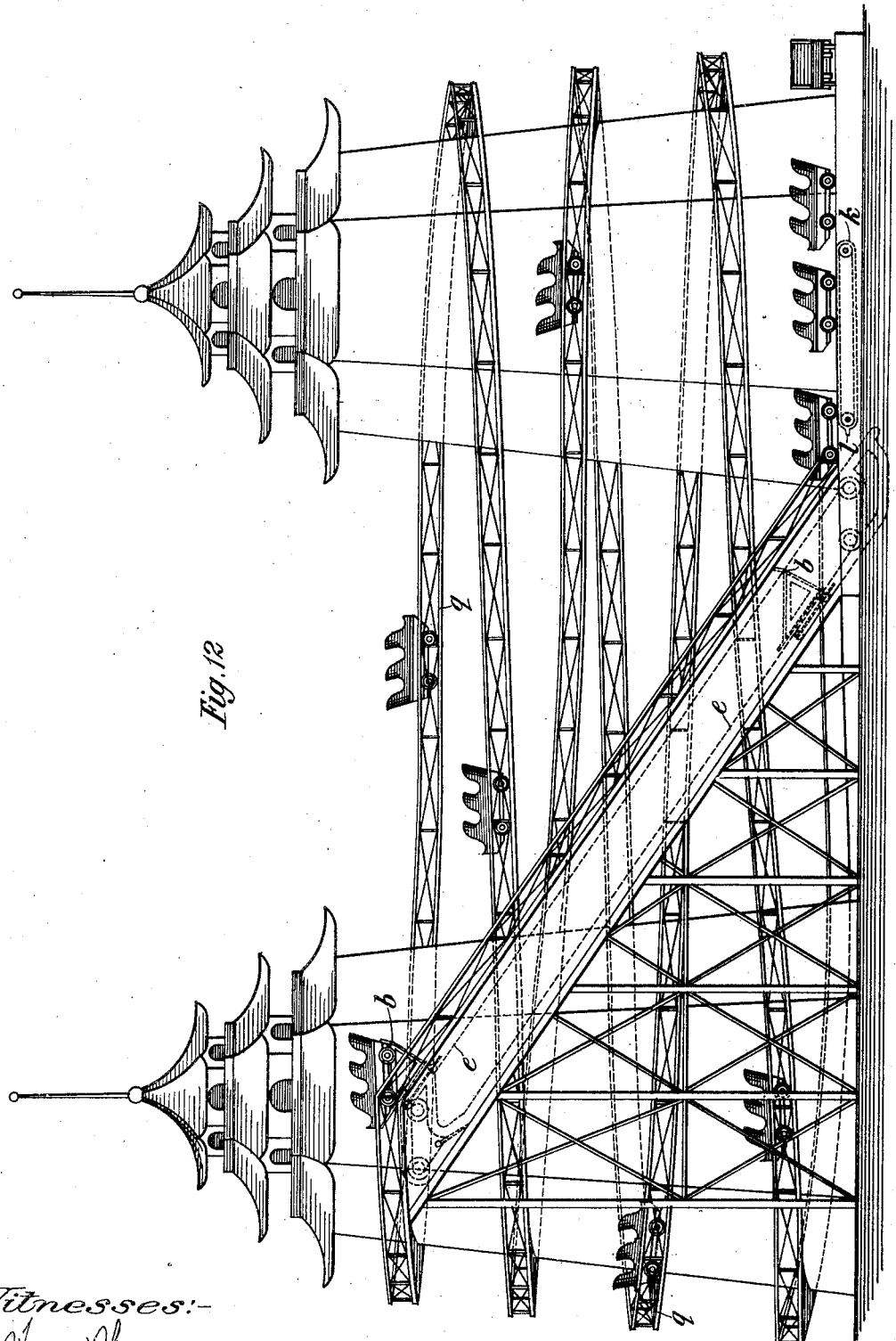

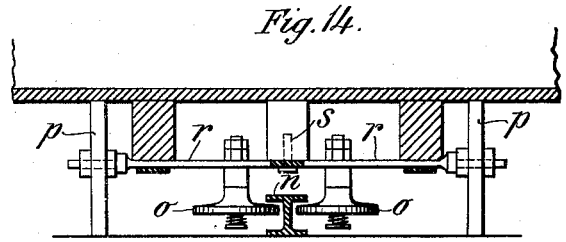
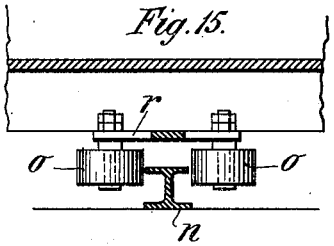
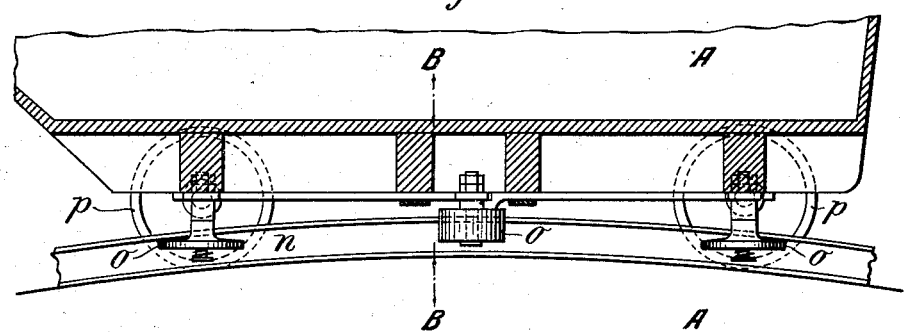

No. 896,430. PATENTED AUG. 18, 1908.
R. H. BISHOP & W. DOWN.
AMUSEMENT APPARATUS OF THE GRAVITY RAILWAY TYPE.
APPLICATION FILED APR. 3, 1908.

6 SHEETS—SHEET 6.

Witnesses:—
Henry Thiens
F. George Barry.

Inventors:—
Robert Hodges Bishop
William Down
by attorneys
Brown Seward

UNITED STATES PATENT OFFICE.

ROBERT HODGES BISHOP AND WILLIAM DOWN, OF LONDON, ENGLAND, ASSIGNORS TO THE AUTO-CONVEYORS LIMITED, OF LONDON, ENGLAND, A CORPORATION OF GREAT BRITAIN.

AMUSEMENT APPARATUS OF THE GRAVITY-RAILWAY TYPE.

No. 896,430.      Specification of Letters Patent.      Patented Aug. 18, 1908.

Application filed April 3, 1908. Serial No. 424,901.

*To all whom it may concern:*

Be it known that we, ROBERT HODGES BISHOP and WILLIAM DOWN, subjects of the King of Great Britain, and residents, respectively, of 4 Highbury Mansions, Upper street, Islington, London, England, and 73 Claremont road, Highgate, London, England, respectively gentleman and draftsman, have invented new and useful Improvements in Amusement Apparatus of the Gravity-Railway Type, of which the following is a specification.

The present invention is directed to a novel construction of amusement apparatus of the kind which comprises an inclined track or slide and an elevator for raising the pleasure seekers seated in cars to the point where the descent of the slide begins.

The novelty of the construction relates in part to the track and in part to the elevator and in part to the car which is raised by the elevator and discharged down the incline.

With regard to the track and the car it has been proposed to provide a third or central rail engaging with steering mechanism on the car so that the wheels of the latter will be turned with their axles to conform to the curves comprised in the track. We do not propose to employ rails for the wheels of the car or cars to run on but we adopt the central rail engaging with steering mechanism on the cars and we add to the said rail a T head so that it will operate both as a safety and steering rail thus enabling the ordinary flanged running wheels and rails to be superseded by wheels without flanges which will run on a floor without rails.

The amusement apparatus embodying all our improvements will now be described and the features of novelty will be hereinafter pointed out in the claims.

Figure 1:
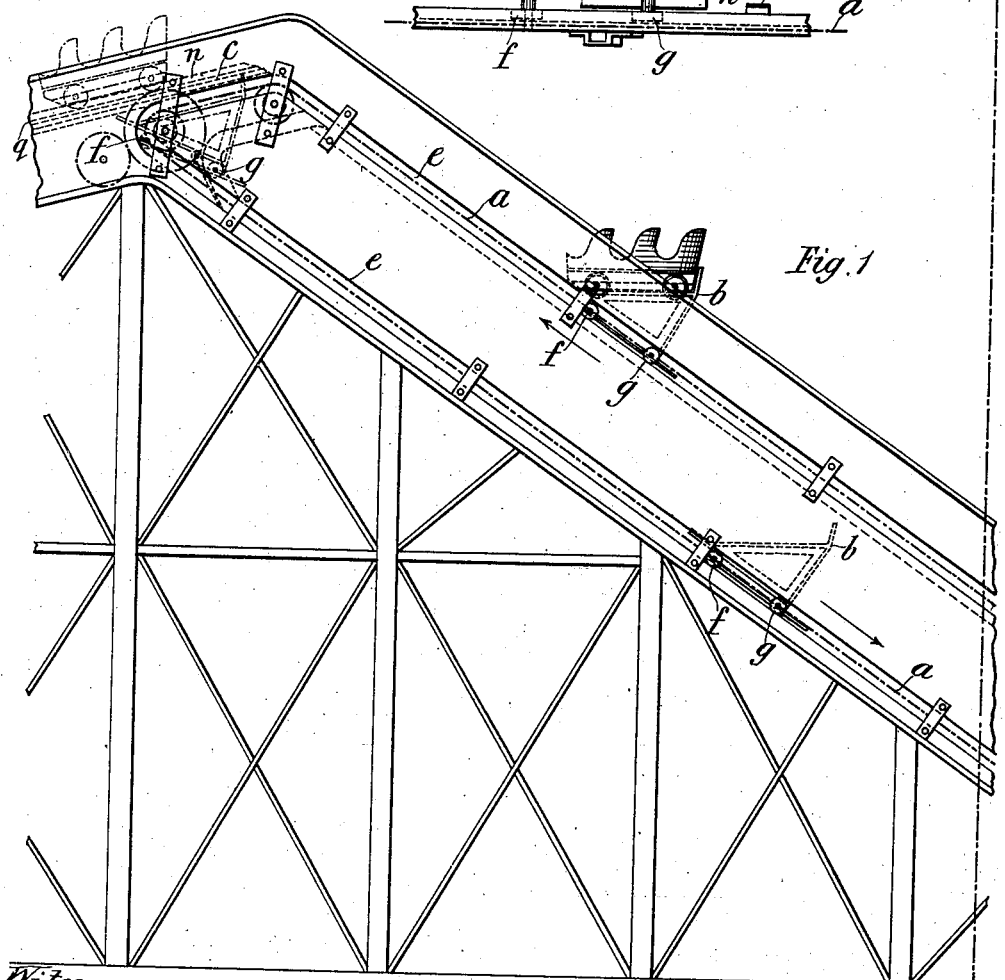
Figure 8:
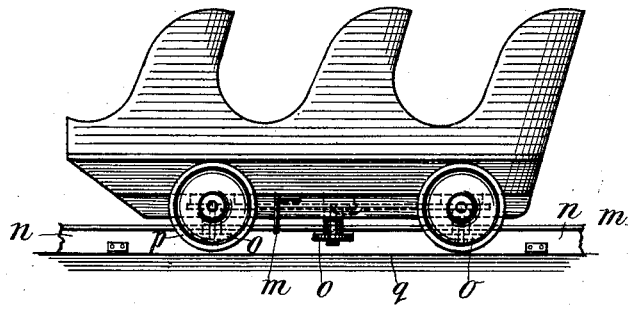
Figure 7:
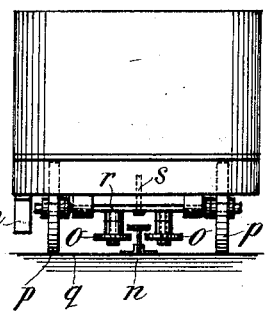
Figure 9:
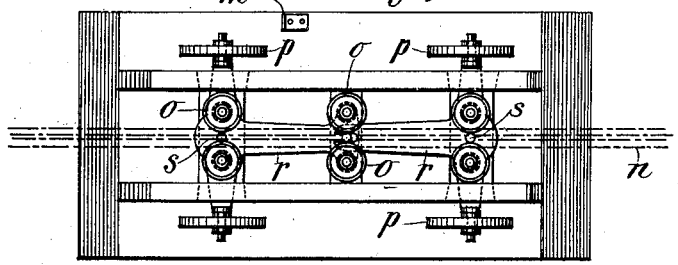
Figure 10:
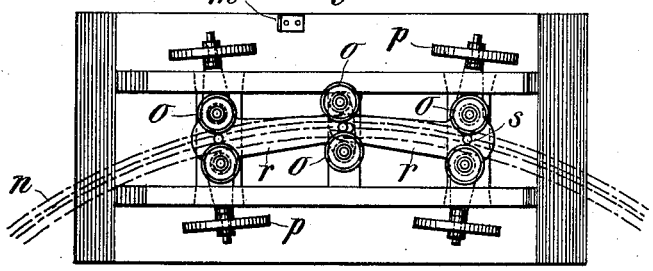
Figure 11:
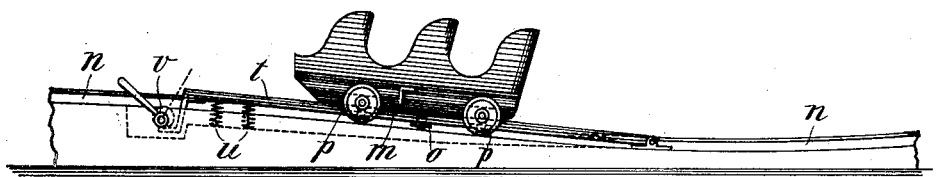
Figure 16:
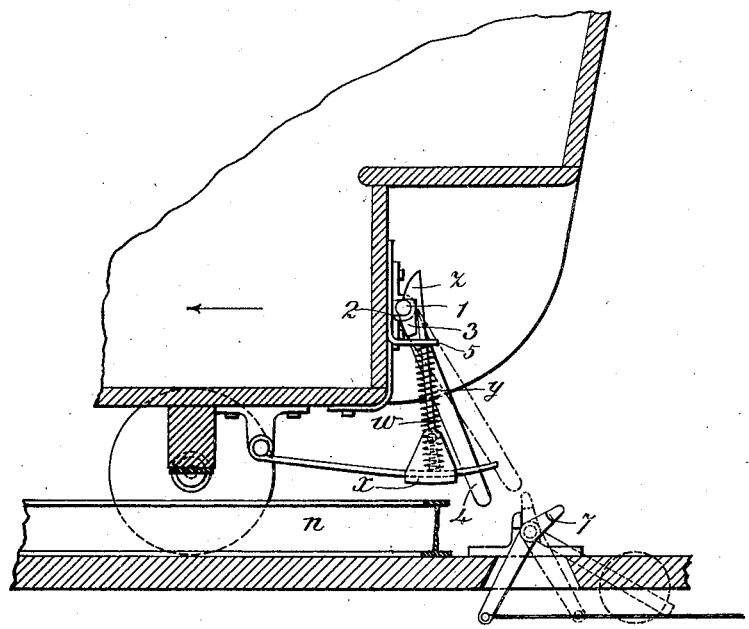
Figure 17:
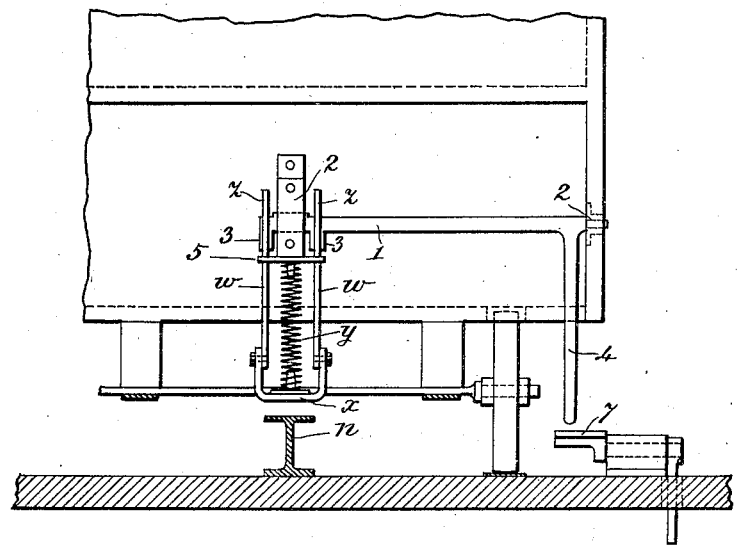

In the accompanying drawings, Figures 1 and 1ª show in side elevation the improved construction of elevator employed. Figs. 2 and 2ª are a plan view of the same. Fig. 3 is a back view and Fig. 4 a plan view of one of the forked platforms used for raising the cars to the top of the elevator and depositing them on the forked stages ready to commence their course down the inclined track on leaving the elevator. Fig. 5 is a sectional elevation on an enlarged scale showing the lower end of the elevator with a car standing on the forked stage ready to be lifted by the advancing platform and Fig. 6 is a plan view of the same. Fig. 7 shows in back view a car on the track, with the guide rail and rollers engaging therewith, and Fig. 8 is a side view of the same. Fig. 9 is an inverted plan view of the car showing the position of the guiding wheels and the running wheels, with the guide rail, when passing along a straight portion of the track, and Fig. 10 shows the position the wheels are caused to take by the guide rail when passing round a curve. Fig. 11 shows the braking device for stopping the cars at any point desired, and Fig. 12 is an illustration of an elevator and track complete showing the course of the cars from the start to the finish, and the return of the cars to the position ready to be again elevated. Fig. 13 is a longitudinal section of a car with a slightly modified arrangement of steering wheels. Fig. 14 is a transverse section on the line A—A and Fig. 15 is a similar section on the line B—B of Fig. 13 looking towards the right. Fig. 16 is a sectional side elevation of the back portion of a car with a brake attached thereto and Fig. 17 is a back view of the same.

The following is a description of the improved elevator by means of which cars, of which any suitable number may be employed, are raised to the summit of the inclined track.

The construction of elevator which we employ is shown in Figs. 1 to 5 and embodies a pair of endless traveling chains *a* and forked triangular platforms *b b* carried thereby and forming horizontal platforms to support the cars while being raised. The platforms are formed to intermesh with stationary forked stages *c d* at the top and bottom of the elevator so that the platforms can pass the stages both to raise and to deposit the load. The novel feature of the present arrangement of elevator is not the employment of the forked platforms and stages but the method of guiding the platforms *b* in their upward and downward course.

According to our improvements the endless chains *a* are arranged to travel in grooves *e e* one on each side of the framing, which incloses the elevator platforms. The platforms are provided with two pairs of wheels

*f g* both being in the same vertical plane and running in the same grooves as the chains *a*. The grooves *e* are continuous forming parallel sided figures with irregularly formed ends. At the ends the grooves are duplicated as shown at Fig. 1 so that at the ends the front wheels *f* and the back wheels *g* can cross over in different paths, the former however following always the course of the chains which are indicated by dotted lines in Fig. 1 and by drawn lines in Fig. 5. The axle of the front pair of wheels *f* projects beyond the wheels and is there attached to the chains *a* which support the said wheels past the opening to the second or shorter path on the upward journey. The back wheels *g* however being unsupported by the chains drop by gravity into the said opening and cross over into the downward portion of the chain grooves as shown by dotted lines. The front wheels *f* travel round the longer path with the chains and then follow the back wheels *g* instead of leading them. At the lower end the back, now the leading, wheels follow the longer path while the front wheels travel the path of the chains, viz. the inside path. When the crossing over is complete the front wheels are again leading.

Figure 4:
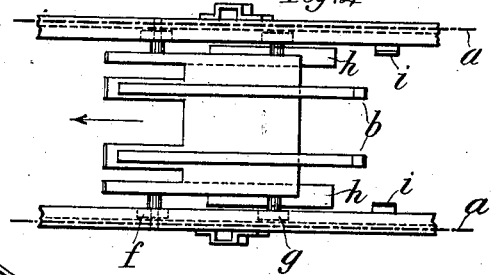

To prevent the back wheels *g* from falling back along the path they have come, or into the opening of the path of the front wheels *f* the platforms *b* are provided with laterally projecting plates *h*, and the sides of the framing near the grooves with projecting lugs *i* (see Figs. 4 and 5). These plates and lugs are so disposed that the plates *h* ride on the lugs *i* as shown at Fig. 5 and support the platforms *b* when the back wheels *g* are unsupported owing to the crossing of the openings aforesaid.

In conjunction with the gearing of the endless chains *a* is arranged another chain *k* constantly running but provided with a lug *l* for engaging with a bracket *m* projecting down from the underside of each car and advancing the cars at intervals onto the stages to await the arrival of the platforms of the elevator. The total length of the chain *k* is equal to the distance between the platforms on the chain *a* and it is geared so as to travel at the same rate as that chain.

In an amusement apparatus of the kind which comprises an inclined or undulating track where there are curves and bends, it is essential that means shall be provided for guiding the cars running thereon and also keeping them safely in their proper course. According to this invention we accomplish this object by the employment of a guide rail *n* (see Figs. 7 and 8) which we provide with a T head or its equivalent. The cars are provided with rollers *o o* mounted on vertical axes placed to underlie the T head of the guide rail on either side of the web thereof when the cars are descending the track. Ordinary wheels *p p* are used for supporting the weight of the cars which wheels run on the floor *q* of the track instead of upon rails as is usual in gravity railways. Cars running down the incline cannot leave their proper course or turn over by reason of the rollers *o o* engaging with the sides or head of the guide rail *n* as the case may be. To facilitate the guiding of the cars by the rail *n* the axles of the car wheels *p* are formed on the ends of T shaped plates *r* pivoted at *s* to the underside of the cars. These plates also carry the vertically mounted rollers *o o* which embrace the guide rail *n*. At the center of the car the plates *r* are caused to interlock through a pin on one plate and a slot on the other. When therefore the car is passing round a curve as shown at Fig. 10, the guide rail *n* will, as seen in that figure, rock the pair of plates *r* on their pivots *s* and cause the axles of the wheels *p* to converge towards the center of such curve, thus guiding the cars and keeping them safely in their proper course. Where the track runs in comparatively small undulations it is desirable that the middle pair of the vertically mounted rollers *o*, that is to say, those that effect the rocking of the plates *r* to steer the car, should not engage the web of the rail *n* as there may not be room in a vertical direction between the head and the base for the said rollers to rise and fall when the up and down bends are being passed.

In the drawings Figs. 13, 14 and 15 the middle rollers which steer the car are shown of extra depth and bearing against the edge of the head instead of against the web. The other rollers at the front and back of the cars underlie the rail head and act as retainers as above described. At the end of the incline the cars are stopped as usual by a rise and preferably a braking device is provided as shown at *t* Fig. 11 which is normally raised to come into contact with the underside of the car by means of springs *u u* and can be pressed down clear of the cars by the eccentric and lever *v*. The central guide rail *n* is continued to the elevator approach so that the proper engagement of the cars with the safety guide of the track is insured by providing a proper alinement in the first instance.

To enable cars to be stopped on the track by an attendant at a station overlooking the latter the arrangement of brake mechanism shown at Figs. 16 and 17 is sometimes employed.

Pendent from the car immediately above the guiding rail *n* is a frame *w* provided with a brake shoe *x* and having a downward tendency by reason of the spring *y* to bring the shoe into contact with the said rail. The frame *w* is normally held up by hooks *z* thereon engaging with the bar 1 fulcrumed at 2 upon the car. The hooks are knocked off the bar 1 by kicker levers 3 thereon when the bar is rocked by means of the pendent arm 4 and the shoe descends into contact with the rail.

5 is a strap piece for guiding and retaining the frame and 6 is a tension bar for supporting the frame $w$ in a sidewise direction. The arm 4 is tripped when the brake is to be applied by raising the end of a lever 7 into its path by means of a cord or chain attached to a lever in any suitable position.

What we claim and desire to secure by Letters Patent of the United States, is:—

1. In an amusement apparatus of the gravity railway type, an inclined track, a T-headed rail on the said track, a car running on the said track provided with steering wheels engaging with the rail and with safety wheels and an elevator for lifting the car to the summit of the track and placing it with its steering and safety wheels engaging with the T-headed rail.

2. In conjunction with an amusement apparatus of the gravity railway type comprising an elevator, an inclined track provided with a T headed safety and guiding rail and a car furnished with pairs of rollers for engaging the said safety and guiding rail; means for presenting the cars to the elevator in such a manner that the elevator will raise them separately at intervals and present them in a position for these guiding rollers to engage with the safety and guiding rail at the summit of the inclined track.

3. In an amusement apparatus of the gravity railway type comprising an inclined track, a car running thereon and means for raising the car to the summit of the incline, the employment of an elevator consisting of endless chains carrying forked platforms, the prongs of which intermesh with forked stages to raise or deposit cars from or upon the latter, the essential characteristic of the elevator being that while the platforms retain a horizontal position in their upward course and return approximately horizontal without being inverted, their supporting wheels both back and front follow the same path as the chains and only deviate from it at the top and bottom of the course where the back and front portions cross over and alternately lead in the manner hereinbefore explained.

In testimony whereof we have signed our names to this specification in the presence of two subscribing witnesses.

ROBERT HODGES BISHOP.
WILLIAM DOWN.

Witnesses:
H. D. JAMESON,
R. F. WILLIAMS.